(12) United States Patent
Sugiyama

(10) Patent No.: US 8,915,787 B2
(45) Date of Patent: Dec. 23, 2014

(54) SLIDING TYPE CONSTANT VELOCITY UNIVERSAL JOINT

(75) Inventor: Tatsuro Sugiyama, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/816,320

(22) PCT Filed: Jul. 27, 2011

(86) PCT No.: PCT/JP2011/067081
§ 371 (c)(1),
(2), (4) Date: Feb. 11, 2013

(87) PCT Pub. No.: WO2012/023390
PCT Pub. Date: Feb. 23, 2012

(65) Prior Publication Data
US 2013/0137526 A1   May 30, 2013

(30) Foreign Application Priority Data

Aug. 20, 2010 (JP) ................................ 2010-184946

(51) Int. Cl.
*F16D 3/205* (2006.01)

(52) U.S. Cl.
CPC .............. *F16D 3/205* (2013.01); *F16D 3/2055* (2013.01); *Y10S 464/905* (2013.01)
USPC ........................... 464/111; 464/169; 464/905

(58) Field of Classification Search
USPC .......................... 464/111, 123, 124, 169, 905
See application file for complete search history.

(56) References Cited

U.S. PATENT DOCUMENTS

| 6,190,260 | B1 * | 2/2001 | Flores et al. .................. 464/111 |
| 7,704,148 | B2 * | 4/2010 | Izumino et al. ............... 464/111 |
| 8,353,777 | B2 * | 1/2013 | Mondragon-Parra et al. ............................ 464/111 |
| 2008/0234057 | A1 | 9/2008 | Takekawa |
| 2010/0022314 | A1 | 1/2010 | Gresse |

FOREIGN PATENT DOCUMENTS

| EP | 0 169 091 | 3/1988 |
| JP | 61-13029 | 1/1986 |
| JP | 2008-82393 | 4/2008 |
| JP | 2008-232303 | 10/2008 |

OTHER PUBLICATIONS

International Search Report issued Oct. 18, 2011 in International (PCT) Application No. PCT/JP2011/067081.
International Preliminary Report on Patentability issued Mar. 28, 2013 in International (PCT) Application No. PCT/JP2011/067081.

* cited by examiner

*Primary Examiner* — Gregory Binda
(74) *Attorney, Agent, or Firm* — Wenderoth, Lind & Ponack, LLP

(57) ABSTRACT

In a sliding type constant velocity universal joint which includes a coil spring (14) employed to urge an intermediate shaft (13), a cylindrical portion (34) of a spring receptacle which supports an end of the coil spring (14) rises by a height h3, so that an edge (37) of the cylindrical portion (34) makes contact with a lower end surface of an outer ring (26) of a roller assembly (28) of an inner joint member (12) when the constant velocity universal joint takes a maximum operating angle.

18 Claims, 8 Drawing Sheets

US 8,915,787 B2

SLIDING TYPE CONSTANT VELOCITY UNIVERSAL JOINT

BACKGROUND OF THE INVENTION

1. Technical Field

The present invention relates to constant velocity universal joints used in power transmission devices of, e.g., automobiles and various kinds of industrial equipment, and more particularly to sliding type constant velocity universal joints.

2. Description of the Related Art

There is known a drive-power transmission structure for automobiles, using a pair of sliding type constant velocity universal joints, where each universal joint in the pair is disposed between an axle of the left or the right wheel and a differential gear system via an intermediate shaft (Patent Literature 1). In the sliding type constant velocity universal joint described above, the intermediate shaft is subject to axial displacement and therefore indefinite in position, potentially leading to a situation that the other end of the intermediate shaft will make contact with an inner end surface of an outer joint member of the other constant velocity universal joint in the pair, resulting in generation of noise and/or vibration.

In order to prevent generation of these noise and vibration, there is utilized an arrangement where, in one of the constant velocity universal joints, a coil spring is placed in a compressed state, between the inner end surface of the outer joint member and the said other end of the intermediate shaft, thereby urging the intermediate shaft toward the other constant velocity universal joint in the pair and thereby pressing the other end of the intermediate shaft to a receptacle member which is provided in the inner end surface of the outer joint member.

FIG. 6 shows such a conventional tripod sliding type constant velocity universal joint which includes the coil spring as described. The figure shows a state where an operating angle is zero degree. This constant velocity universal joint is implemented by an assembly of an outer joint member 11, an inner joint member 12, an intermediate shaft 13, a coil spring 14 and a spring receptacle member 115. The intermediate shaft 13 is generally provided by a torque transmission shaft; however, the intermediate shaft 13 so termed herein refers to a torque transmission shaft which is interjacent to the other sliding type constant velocity universal joint.

The outer joint member 11 is constituted by a cup-shaped mouth portion 16 which has one open end, and a stem portion 17 protruding coaxially therewith, out of the closed end of the cup in a direction away from the mouth portion 16. An axial guide groove 18 is formed at a one-third equally dividing position in a circumferential direction of an inner circumferential surface of the mouth portion 16. Also, a spring receptacle recess 19 is formed at a center in an inner bottom surface. The stem portion 17 is formed with a spline 21 (the term includes serrations; the same definition applies hereinafter).

The inner joint member 12 has a radially protruding journal shaft, i.e., so called trunnion shaft 24, at a one-third equally dividing position around a boss 23. The boss 23 is formed with a spline hole 22 at its center. The trunnion shaft 24 is elliptically cylindrical, and a roller assembly 28 which is constituted by an inner ring 25, an outer ring 26, and needle rollers 27 placed therebetween is pivotably fitted with a certain margin in the direction of trunnion shaft 24. Further, the roller assembly 28 is fitted rotatably in the guide groove 18.

The inner ring 25 and the needle rollers 27 are integrated with the outer ring 26 by snap rings 29a, 29b which are placed between end surfaces of the outer ring 26 and of the inner ring 25 on both of the inner and the outer sides.

The intermediate shaft 13 has an end portion formed with a spline shaft section 30. The spline shaft section 30 has its tip surface formed as a convex spheroidal surface 31. The spline shaft section 30 is fitted through the spline hole 22 of the inner joint member 12, and is fastened in place by a snap ring 32. The convex spheroidal surface 31 protrudes inward of the mouth portion 16, from the spline hole 22.

As shown in FIG. 8, the spring receptacle member 115 is a cup-shaped member having a bottom plate 33 which is formed into a concave spheroidal surface for contact with the convex spheroidal surface 31, and a low-walled cylindrical portion 134 which rises from a circumferential edge of the bottom plate 33 toward the spring receptacle recess 19. The cylindrical portion 134 rises by a height h1, which is approximately equal to two windings of the coil spring 14 shown in FIG. 6 when the operating angle is zero degree. A seat 135 for the coil spring 14 is provided by a corner regions made by an inner bottom surface of the bottom plate 33 and inner circumferential surface of the cylindrical portion 134 rising therefrom.

The coil spring 14 is placed in a compressed state between the spring receptacle recess 19 and the spring receptacle member 115. On the spring receptacle member 115 side, the coil spring 14 has its end pressed onto the seat 135, i.e., onto the circumferential edge region of the bottom plate 33 along the inner circumferential surface of the cylindrical portion 134.

FIG. 7 shows an operating state at a certain predetermined operating angle θ (the angle in the figure is 15 degrees). Under this state, there can be a situation where the spring receptacle member 115 slips and tilts in a direction away from tilt of the intermediate shaft 13. Simultaneously, an end portion of the coil spring 14 moves away, resulting in a situation that said end portion of the coil spring 14 is bent with respect to the other end portion which is supported by and fixed in the spring receptacle recess 19.

Although the conventional constant velocity universal joint described above has no problem when the operating angle θ is zero degree or the angle is small, the spring receptacle member 115 tilts to a greater extent as shown in FIG. 7 once the operating angle θ reaches a certain large angle, allowing an edge 37 on top of the cylindrical portion 134 to come off the outer ring 26, resulting in interference with an intricately-shaped portion of the roller assembly 28 including steps formed by the snap ring 29a, an end surface of the inner ring 25, etc. on the back surface of the roller assembly 28. Such an interference destabilizes rotation of the roller assembly 28, and can adversely affect operability of the constant velocity universal joint.

One attempt to solve the above-described problem is implemented in a sliding type constant velocity universal joint (Patent Literature 2), in which the cylindrical portion 234 is given an increased height h1 so that the edge 37 would not make interference with the back surface of the roller assembly 28.

In this case, as shown in FIG. 9, the cylindrical portion 234 has a height h2 (>h1), being higher by one additional wind of the coil spring 14. More precisely, as shown in FIG. 10, the cylindrical portion's height h2 is increased to an extent that the cylindrical portion 234 of the spring receptacle member 215 has its outer circumferential surface always in contact with the outer ring 26, not allowing the edge 37 to make contact therewith before the operating angle θ reaches the maximum angle and even after it has reached it. Such a setting gives a fair level of stable operation since the edge 37 does not come off the outer ring 26 even when the maximum angle is reached and therefore there is no interference with the back surface of the roller assembly 28.

CITATION LIST

Patent Literature

[Patent Literature 1] JP-A 2008-82393 Gazette (FIG. 2)
[Patent Literature 2] US Patent Publication US2010/0022314A1

SUMMARY OF THE INVENTION

1. Technical Problem

As has been described so far, the prior art shown in FIG. 9 and FIG. 10 has achieved the intended object in that the edge of the spring receptacle member 215 does not make interference with the back surface of the roller assembly 28. However, there is still a room for improvement in terms of weight reduction which is required of current automotive parts.

It is therefore an object of the present invention to provide an arrangement in which the spring receptacle member's edge will not interfere with the back side of an intricately-shaped portion of the roller assembly even when the operating angle of the sliding type constant velocity universal joint becomes large and the spring receptacle member becomes tilted, thereby providing a sliding universal joint of excellent operability and of a reduced weight as well by reducing the size and weight of the spring receptacle member from conventional ones.

2. Solution to Problem

In order to achieve the above-described objects, the present invention provides a sliding type constant velocity universal joint which comprises: an outer joint member; an inner joint member slidable with respect to the outer joint member; a torque transmission shaft fitted into a center of the inner joint member; a spring receptacle member for contact with a convex spheroidal surface of an inner of the torque transmission shaft; and a coil spring placed in a compressed state between the spring receptacle member and an inner bottom surface of the outer joint member. The inner joint member includes a boss portion fitted around the torque transmission shaft; a trunnion shaft formed in the boss portion; and a roller assembly pivotably fitted around the trunnion shaft and placed rotatably in a guide groove of the outer joint member. The spring receptacle member includes a bottom portion for contact with the convex spheroidal surface; and a cylindrical portion rising from an circumferential edge of the bottom portion. The compressed coil spring has its end inserted inside the cylindrical portion whereas the outer joint member has a stem portion working together with the torque transmission shaft at a predetermined operating angle in torque transmission. With the above-described arrangement, the cylindrical portion of the spring receptacle member rises by a height which allows an edge of the cylindrical portion to make contact with a lower end surface of an outer ring of the roller assembly of the outer joint member when the operating angle reaches its maximum.

3. Advantageous Effects of Invention

According to the arrangement described above, the edge of the spring receptacle member does not come off the lower end surface of the outer ring even when the operating angle of the constant velocity universal joint is maximum. Therefore, interference between the edge and an intricately-shaped portion of the roller assembly is avoided, and stable operation is achieved.

Also, the cylindrical portion rises by such a height that the edge thereof in the spring receptacle member makes contact with a lower end surface of an outer ring. This means the spring receptacle member is smaller and lighter than conventional ones, which helps weight reduction of the constant velocity universal joint.

DETAILED DESCRIPTION OF THE INVENTION

Hereinafter, embodiments of the present invention will be described based on the attached drawings.

Embodiment 1

Figure 6:
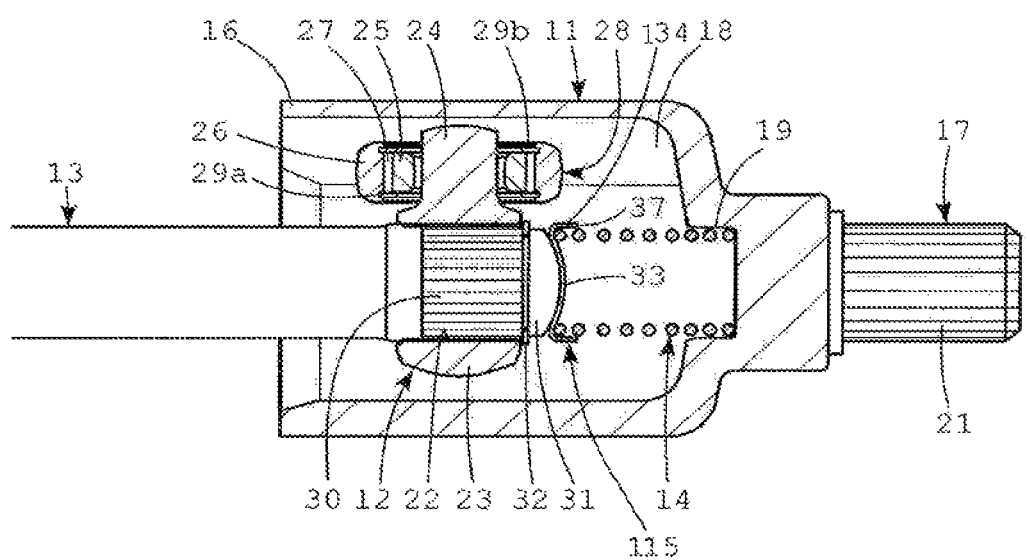
FIG. 6 is a sectional view of a conventional sliding type constant velocity universal joint when an operating angle is
Figure 7:
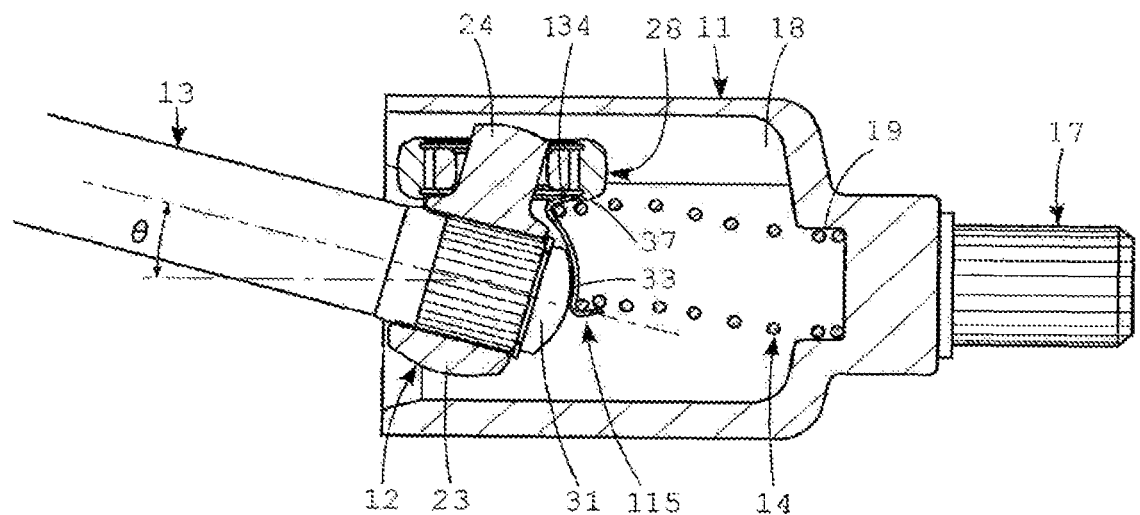
FIG. 7 is a sectional view of the universal joint in FIG. 6 when the operating angle θ is a certain predetermined angle.
Figure 8:
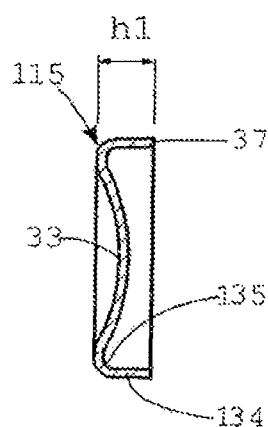
FIG. 8 is an expanded sectional view of a spring receptacle member in FIG. 6.

FIG. 1 through FIG. 4 show Embodiment 1, which is a tripod sliding type constant velocity universal joint exactly the same as those described in "Background Art" based on FIG. 6 through FIG. 8, excluding only the shape of the spring receptacle member 15. Therefore, FIG. 1 through FIG. 4 use the same reference symbols for the same parts and components, with all descriptions made in "Background Art" being applied thereto. Description hereinafter will cover primarily the new spring receptacle member 15.

Figure 1A:
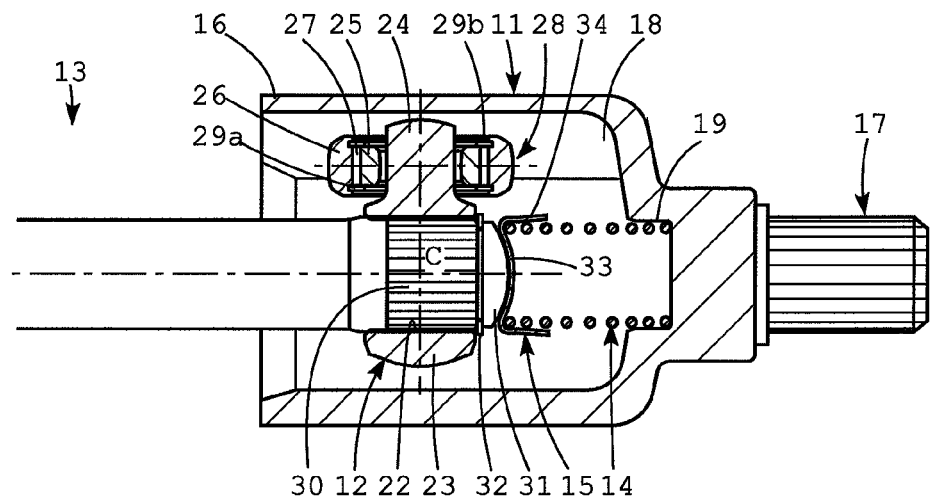
FIG. 1A is a sectional view of a sliding type constant velocity universal joint according to Embodiment 1 when an operating angle is 0°.
Figure 1B:
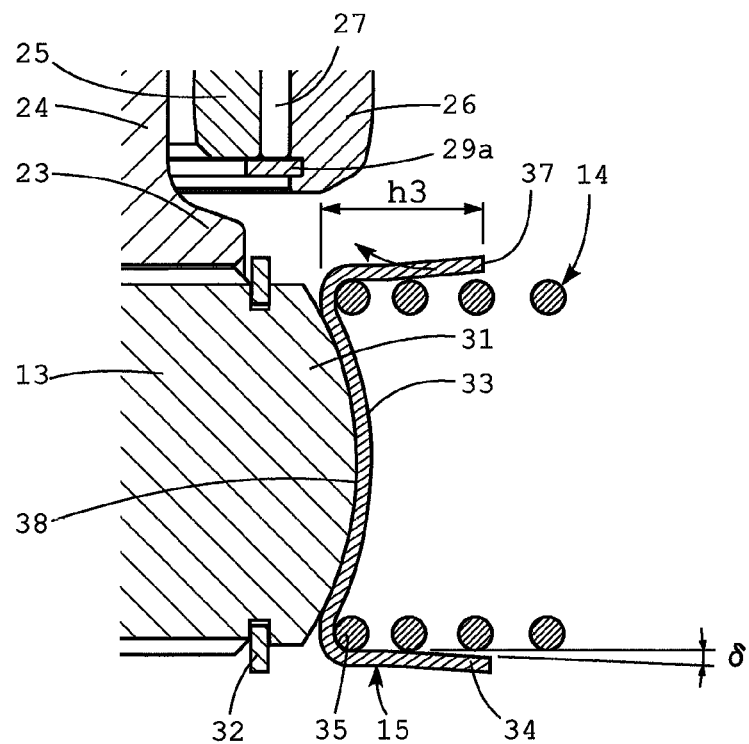
FIG. 1B is an expanded sectional view of a portion taken from FIG. 1A.

As shown in FIG. 1A, the spring receptacle member 15 in this case is basically the same as the conventional one in that it has a bottom plate 33 and a cylindrical portion 34 which rises from a circumferential edge of the bottom plate 33 to a certain height. Also, the bottom plate 33 is identical with the conventional one in that it has a circular form having the same area as of a tip portion of an intermediate shaft 13; that its outer bottom surface is shaped to make surface contact with a convex spheroidal surface 31 at the tip of the intermediate shaft 13, being formed into a concave spheroidal surface 38 recessing inward of a spring receptacle member 15; and that the bottom plate 33 and the cylindrical portion 34 make a corner region serving as a seat 35 for an end of a coil spring 14.

Further, the end of the coil spring 14 is fitted into the seat 35 with a predetermined tightening margin. The cylindrical portion 34 of FIG. 1 through FIG. 4 has a taper angle δ with a gradually increasing inner diameter from the seat 35 to an edge 37 at the tip of the cylindrical portion 34, providing a gap from the coil spring 14; and a spring receptacle member 15 is made of a metal and is formed by pressing or by sintering, or the member is made of a synthetic resin.

Figure 4A:
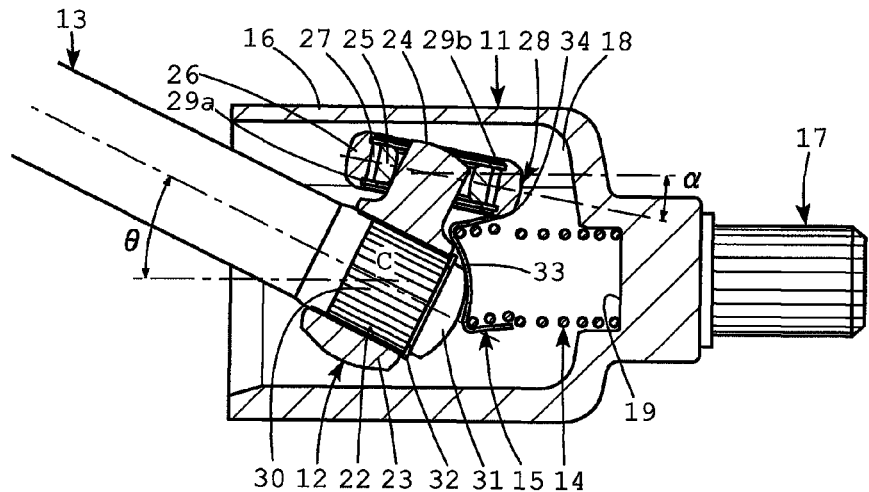
FIG. 4A is a sectional view of Embodiment 1 when the operating angle θ is a maximum angle.
Figure 4B:
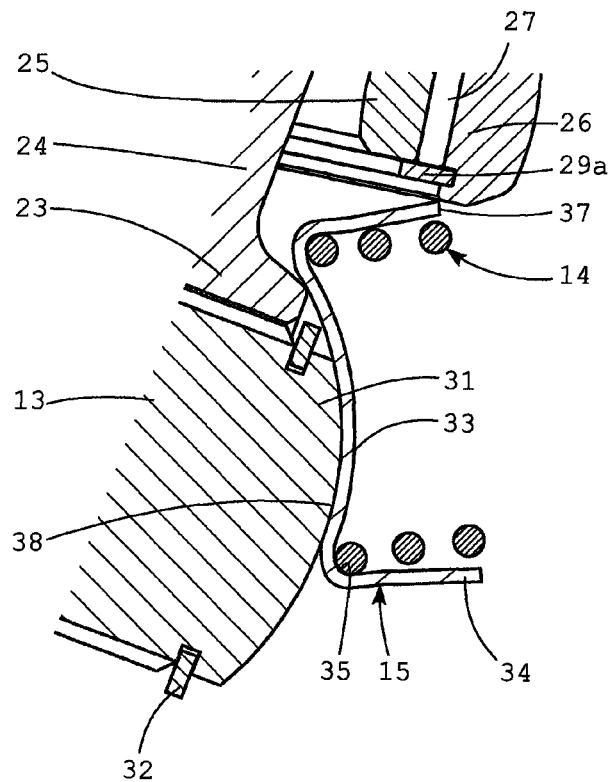
FIG. 4B is an expanded sectional view of a portion taken from FIG. 4A.

A difference from the conventional one is that as shown in FIGS. 4A and 4B, the cylindrical portion 34 rises by a height h3, so that the edge 37 of the cylindrical portion 34 in the spring receptacle member 15 makes contact with a lower end surface (a surface on the spring receptacle member 15 side excluding an inner diameter edge of the outer ring 26; the same definition applies hereinafter) of an outer ring 26 of the roller assembly 28 when the constant velocity universal joint takes a maximum operating angle θ.

Figure 9:
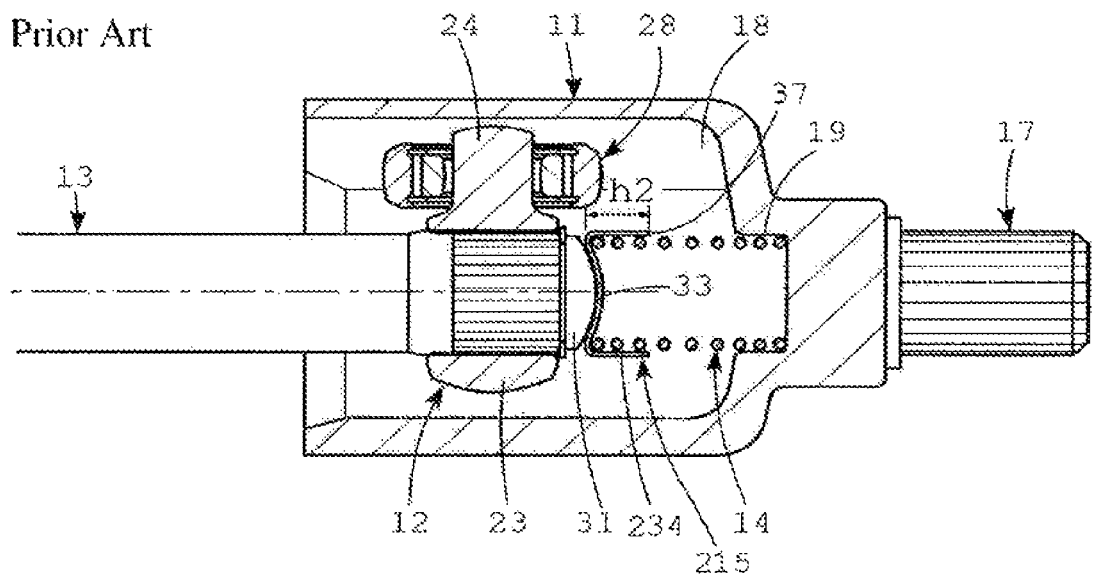
FIG. 9 is a sectional view of another conventional sliding type constant velocity universal joint when an operating angle is 0°.
Figure 10:
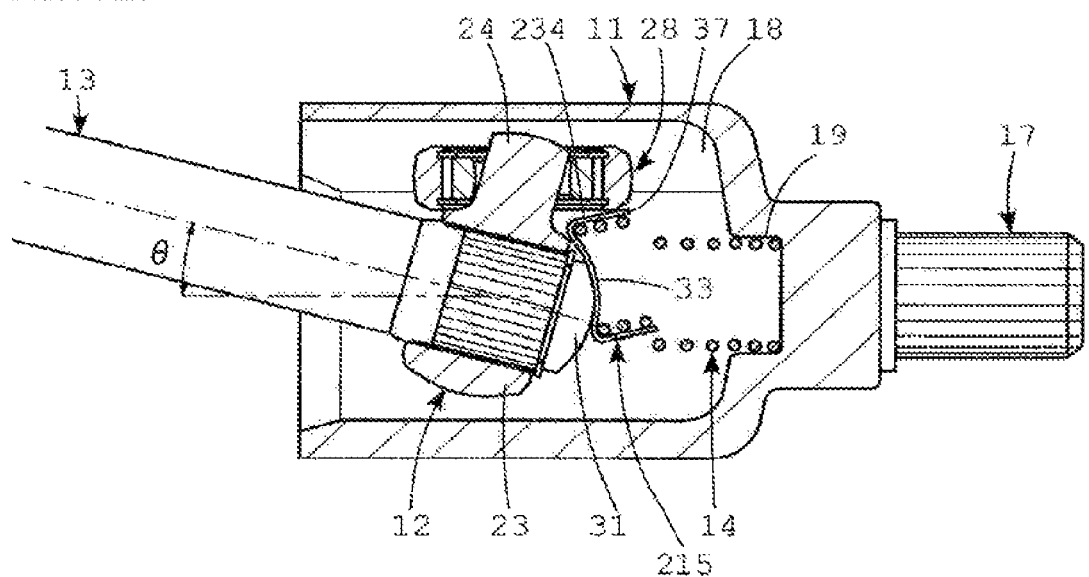
FIG. 10 is a sectional view of the universal joint in FIG. 9 when the operating angle θ is a certain predetermined angle.

As has been described earlier, in the conventional one shown in FIG. 6 through FIG. 8, the cylindrical portion 34 rises by a height h1, and at a maximum operating angle, the edge 37 comes off the outer ring 26 and makes contact with an intricately-shaped portion of the roller assembly 28. Also, in the other conventional joint shown in FIG. 9 and FIG. 10, the cylindrical portion 234 rises by a height h2, which allows contact by an outer circumferential surface of the cylindrical portion 234 at a maximum operating angle. From these relationships, it is understood that the three heights of the cylindrical portions 134, 34, 234 are in a relationship expressed as h1<h3<h2.

Specifically, there is a relationship expressed as h1<h3, and the height h3 is selected so that the edge 37 of the cylindrical portion 34 in the spring receptacle member 15 makes contact with a lower end surface of the outer ring 26 of the roller assembly 28 when the operating angle θ of the constant velocity universal joint takes a maximum value. Consequently in Embodiment 1, the edge 37 does not make contact with an intricately-shaped portion of the roller assembly 28.

Also, a relationship expressed as h3<h2 means that the cylindrical portion 34 of the spring receptacle member 15 has a lower height than in the conventional one, leading to weight reduction accordingly.

The sliding type constant velocity universal joint according to Embodiment 1 has an arrangement as described thus far. Next, description will cover functions thereof.

FIG. 1A shows a case where the operating angle θ is 0 degree, and the roller assembly 28 is at an angle α (hereinafter will be called roller angle α) with respect to the guide groove 18 which is 0 degree. The center of the joint is indicated by a symbol C in the figure. In this case, the spring receptacle member 15 has no tilt, so the concave spheroidal surface 38 of the bottom plate 33 has its entire surface in contact with the convex spheroidal surface 31 of the intermediate shaft 13. The coil spring 14 urges the intermediate shaft 13 in an outward direction, pressing the other end of the intermediate shaft 13 onto the receptacle member of the counterpart constant velocity universal joint, thereby preventing generation of noise and vibration. Torque applied to the stem portion 17 is transmitted from the outer joint member 11, to the inner joint member 12, and then to the intermediate shaft 13.

Figure 2A:
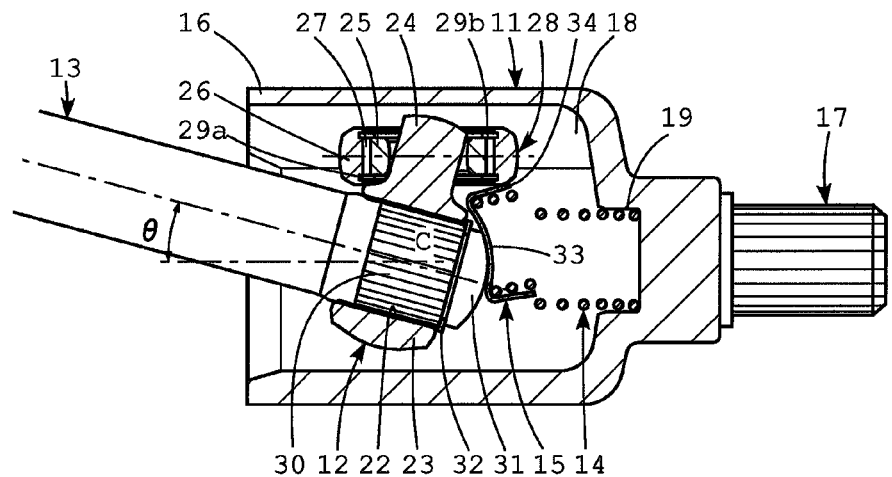
FIG. 2A is a sectional view of Embodiment 1 when the operating angle θ is a certain predetermined angle.

FIG. 2A shows a case where the operating angle θ is approximately 15 degrees and the roller angle α is 0 degree. While the intermediate shaft 13 is tilted, a pressure from the coil spring 14 tends to keep the spring receptacle member 15 at the original position; however, the convex spheroidal surface 31 of the intermediate shaft 13 partially comes off the bottom plate 33 of the spring receptacle member 15. As a result, the spring receptacle member 15 tilts in the opposite direction from the direction in which the intermediate shaft 13 tilts. Accordingly with this tilt, the coil spring 14 is partially bent and is deformed.

Figure 2B:
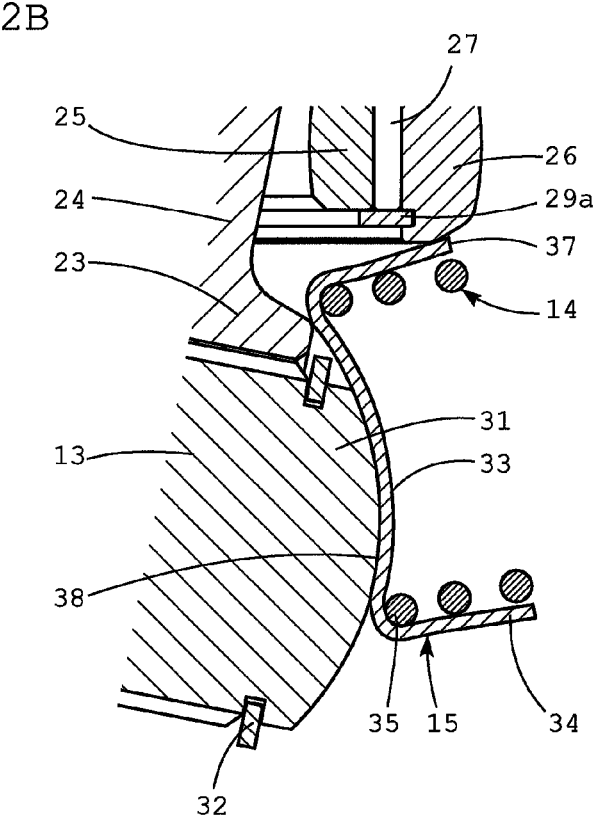
FIG. 2B is an expanded sectional view of a portion taken from FIG. 2A.

As the spring receptacle member 15 tilts as in the above, the outer circumferential surface of the cylindrical portion 34 makes contact with the outer circumferential surface of the outer ring 26 of the roller assembly 28 (see FIG. 2B). The edge 37 of the cylindrical portion 34 has not yet come in contact with the outer ring 26 at this time point.

Figure 3A:
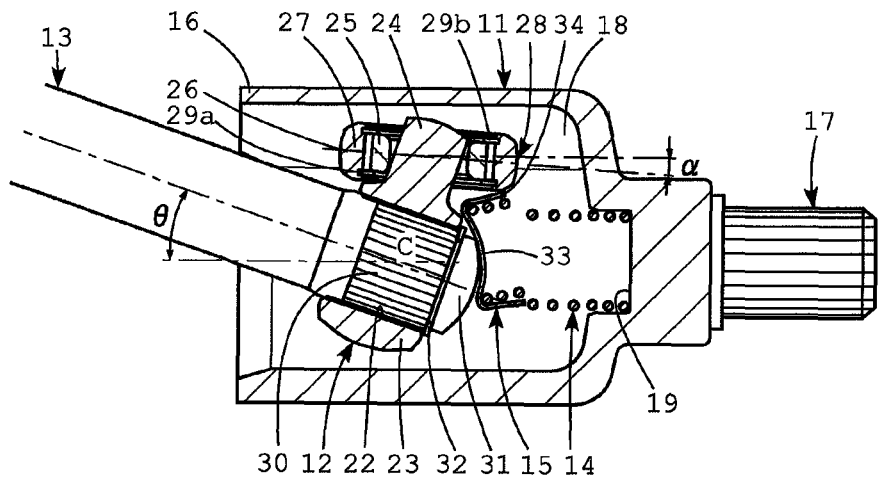
FIG. 3A is a sectional view of Embodiment 1 when the operating angle θ is a certain predetermined angle.
Figure 3B:
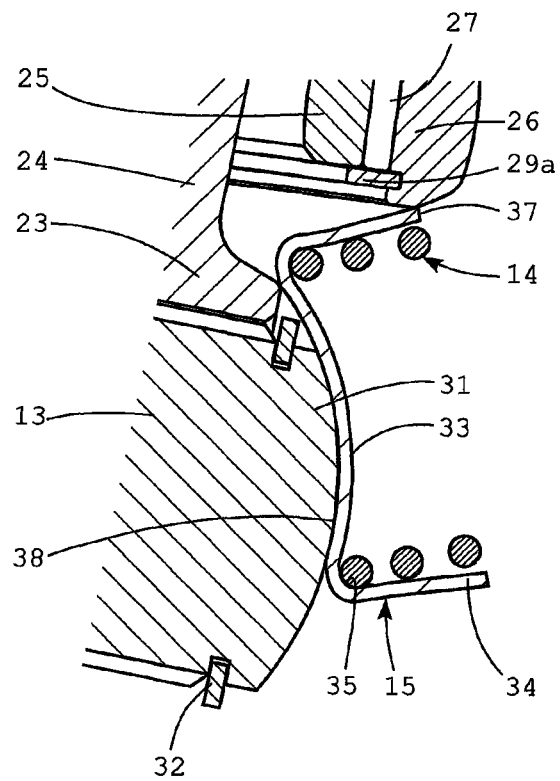
FIG. 3B is an expanded sectional view of a portion taken from FIG. 3A.

FIG. 3A shows a further advanced case, where the operating angle θ has reached approximately 20 degrees. In this case, the cylindrical portion 34 and the outer ring 26 are in contact with each other at a position further closer to the edge 37.

FIG. 4A shows a case where the operating angle θ is at a maximum angle. In this case, the edge 37 is in contact with the lower end surface of the outer ring 26. Interference of the edge 37 with an intricately-shaped portion of the roller assembly 28 is avoided in this case again as far as the edge 37 does not come off the lower end surface of the outer ring 26.

Figure 5A:
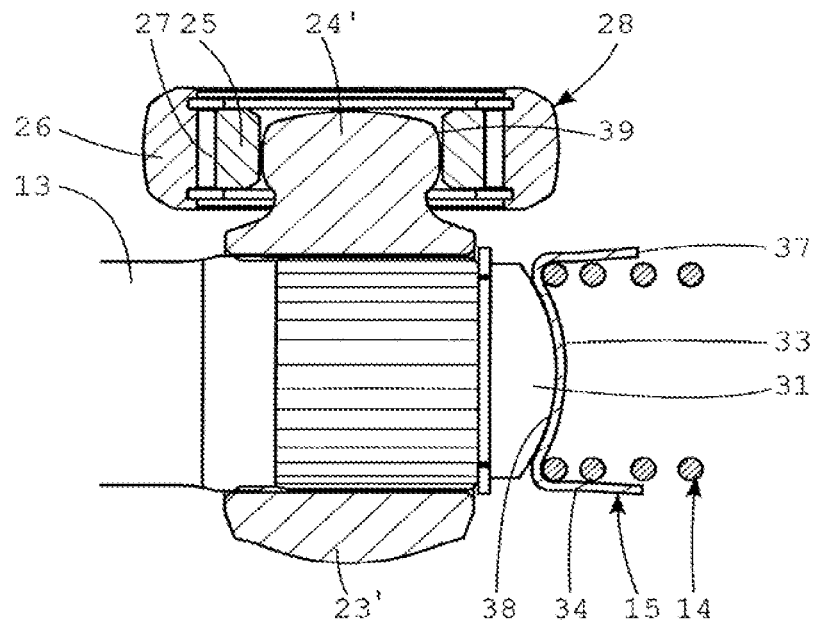
FIG. 5A is a partial sectional view of a variation of a trunnion shaft.
Figure 5B:
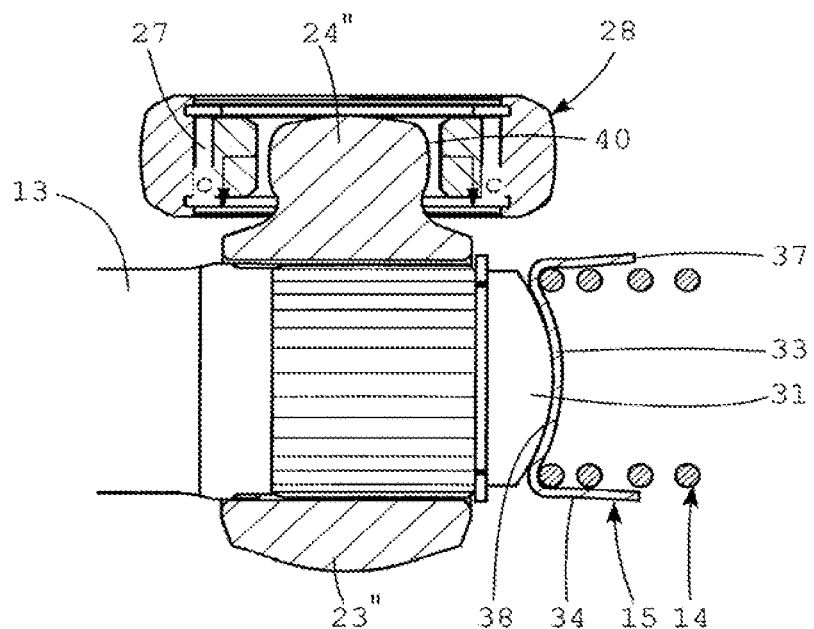
FIG. 5B is a partial sectional view of another variation of the trunnion shaft.
Figure 5C:
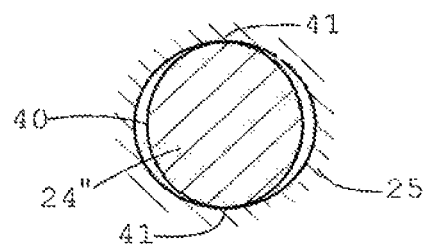
FIG. 5C is a sectional view taken in line c-c in FIG. 5B.

FIG. 5A, FIG. 5B and FIG. 5C show variations of the pivoting structure in the roller assembly 28. FIG. 5A shows an arrangement where a trunnion shaft 24' has a spherical surface portion 39, so that the spherical surface portion 39 makes line contact with the inner ring 25. FIG. 5B and FIG. 5C show a case where a trunnion shaft 24" has an ellipsoidal portion 40 which has an ellipsoidal section. In this case, the inner ring 25 of the roller assembly 28 makes contact with the ellipsoidal portion 40 of the trunnion shaft 24" at an ellipsoidal portion 40 of the inner ring 25 at tangent points 41 on the major axis side of ellipsoidal portion 40.

REFERENCE SIGNS LIST 11 outer joint member
12 inner joint member
13 the intermediate shaft
14 coil spring
15 spring receptacle member
16 mouth portion
17 stem portion
18 guide groove
19 spring receptacle recess
21 spline
22 spline hole
23 boss
23' boss
23" boss
24 trunnion shaft
24' trunnion shaft
24" trunnion shaft
25 inner ring
26 outer ring
27 needle roller
28 roller assembly
29a, 29b snap ring 30 spline shaft section
31 convex spheroidal surface
32 snap ring
33 bottom plate
34 cylindrical portion
35 seat
37 edge
38 concave spheroidal surface
39 spherical surface portion
40 ellipsoidal portion
41 tangent point
115 spring receptacle member
134 cylindrical portion
41 seat
135 seat
215 spring receptacle member
234 cylindrical portion

The invention claimed is:

1. A sliding type constant velocity universal joint comprising:
    an outer joint member having a stem portion;
    an inner joint member slidable with respect to the outer joint member, the inner joint member including a boss portion;
    a torque transmission shaft fitted into a center of the inner joint member;
    a spring receptacle member for contact with a convex spheroidal surface of the torque transmission shaft;
    a coil spring placed in a compressed state between the spring receptacle member and an inner bottom surface of the outer joint member;
    a trunnion shaft formed in the boss portion of the inner joint member; and
    a roller assembly pivotably fitted around the trunnion shaft and placed rotatably in a guide groove of the outer joint member,
    wherein the boss portion is fitted around the torque transmission shaft,
    wherein the spring receptacle member includes a bottom portion for contact with the convex spheroidal surface and a cylindrical portion rising from a circumferential edge of the bottom portion,
    wherein the coil spring has an end inserted inside the cylindrical portion of the spring receptacle member,
    wherein the torque transmission shaft is pivotable with respect to the outer joint member, and an angle between the torque transmission shaft and the stem of the outer joint member is an operating angle of the sliding type constant velocity universal joint, and
    wherein a height of the cylindrical portion of the spring receptacle is such that an edge of the cylindrical portion contacts a lower end surface of an outer ring of the roller assembly of the outer joint member when the torque transmission shaft is pivoted to a maximum angle in the entire range of pivotal motion of the torque transmission shaft.

2. The sliding type constant velocity universal joint of claim 1, wherein the roller assembly includes an inner ring pivotable with respect to the trunnion shaft and said outer ring which is fitted on an outer diameter side of the inner ring via rolling elements.

3. The sliding type constant velocity universal joint of claim 1, wherein the bottom portion of the spring receptacle member has a concave spheroidal surface conforming to the convex spheroidal surface of the torque transmission shaft.

4. The sliding type constant velocity universal joint of claim 1, wherein the bottom portion and an inner corner portion of the cylindrical portion provide a seat for the end of the coil spring.

5. The sliding type constant velocity universal joint of claim 1, wherein the bottom portion and an inner corner portion of the cylindrical portion provide a seat for the end of the coil spring,
    wherein the seat in the cylindrical portion has a tightening margin with respect to the coil spring, and
    wherein the cylindrical portion is configured such that a gap exists between the cylindrical portion and the coil spring from the seat to a tip edge of the cylindrical portion.

6. The sliding type constant velocity universal joint of claim 1, wherein the roller assembly includes an inner ring that is pivotable with respect to the trunnion shaft, the trunnion shaft is elliptically cylindrical, and the inner ring is fitted pivotably with respect to the trunnion shaft, leaving a radial gap.

7. The sliding type constant velocity universal joint of claim 1, wherein the roller assembly includes an inner ring that is pivotable with respect to the trunnion shaft, the trunnion shaft has a spherical surface portion, and the inner ring is fitted pivotably around the spherical surface portion.

8. The sliding type constant velocity universal joint of claim 1, wherein the spring receptacle member is made of a pressed metal.

9. The sliding type constant velocity universal joint of claim 1, wherein the spring receptacle member is made of a sintered metal.

10. A sliding type constant velocity universal joint comprising:
    an outer joint member having a stem portion;
    an inner joint member slidable with respect to the outer joint member, the inner joint member including a boss portion;
    a torque transmission shaft fitted into a center of the inner joint member;
    a spring receptacle member for contact with a convex spheroidal surface of the torque transmission shaft;
    a coil spring placed in a compressed state between the spring receptacle member and an inner bottom surface of the outer joint member;
    a trunnion shaft formed in the boss portion of the inner joint member; and
    a roller assembly pivotably fitted around the trunnion shaft and placed rotatably in a guide groove of the outer joint member,
    wherein the boss portion is fitted around the torque transmission shaft,
    wherein the spring receptacle member includes a bottom portion for contact with the convex spheroidal surface and a cylindrical portion rising from a circumferential edge of the bottom portion,
    wherein the coil spring has an end inserted inside the cylindrical portion of the spring receptacle member,
    wherein the torque transmission shaft is pivotable with respect to the outer joint member, and an angle between the torque transmission shaft and the stem of the outer joint member is an operating angle of the sliding type constant velocity universal joint,
    wherein a height of the cylindrical portion of the spring receptacle is such that an edge of the cylindrical portion contacts a lower end surface of an outer ring of the roller assembly of the outer joint member when the torque transmission shaft is pivoted to a maximum angle in the entire range of pivotal motion of the torque transmission shaft, and wherein the roller assembly includes an inner ring that is pivotable with respect to the trunnion shaft, and the trunnion shaft has an ellipsoidal portion which has an ellipsoidal section across a shaft axis, and the inner ring is fitted pivotably with respect to the ellipsoidal portion.

11. A sliding type constant velocity universal joint comprising:

an outer joint member having a stem portion;

an inner joint member slidable with respect to the outer joint member, the inner joint member including a boss portion;

a torque transmission shaft fitted into a center of the inner joint member;

a spring receptacle member for contact with a convex spheroidal surface of the torque transmission shaft;

a coil spring placed in a compressed state between the spring receptacle member and an inner bottom surface of the outer joint member;

a trunnion shaft formed in the boss portion of the inner joint member; and a roller assembly pivotably fitted around the trunnion shaft and placed rotatably in a guide groove of the outer joint member, wherein the boss portion is fitted around the torque transmission shaft, wherein the spring receptacle member includes a bottom portion for contact with the convex spheroidal surface and a cylindrical portion rising from a circumferential edge of the bottom portion, wherein the coil spring has an end inserted inside the cylindrical portion of the spring receptacle member, wherein the torque transmission shaft is pivotable with respect to the outer joint member, and an angle between the torque transmission shaft and the stem of the outer joint member is an operating angle of the sliding type constant velocity universal joint, wherein a height of the cylindrical portion of the spring receptacle is such that an edge of the cylindrical portion contacts a lower end surface of an outer ring of the roller assembly of the outer joint member when the torque transmission shaft is pivoted to a maximum angle in the entire range of pivotal motion of the torque transmission shaft, wherein the bottom portion of the spring receptacle and an inner corner portion of the cylindrical portion form a seat for the end of the coil spring, and wherein the cylindrical portion of the spring receptacle has an inner diameter which increases from the seat to a tip of the cylindrical portion.

12. The sliding type constant velocity universal joint of claim 11, wherein the increasing inner diameter of the cylindrical portion of the spring receptacle forms a gap between the cylindrical portion of the spring receptacle and the coil spring which increases from the seat to the tip of the cylindrical portion.

13. The sliding type constant velocity universal joint of claim 11, wherein the roller assembly includes an inner ring pivotable with respect to the trunnion shaft and said outer ring which is fitted on an outer diameter side of the inner ring via rolling elements.

14. The sliding type constant velocity universal joint of claim 11, wherein the bottom portion of the spring receptacle member has a concave spheroidal surface conforming to the convex spheroidal surface of the torque transmission shaft.

15. The sliding type constant velocity universal joint of claim 11, wherein the seat in the cylindrical portion has a tightening margin with respect to the coil spring, and wherein the cylindrical portion is configured such that a gap exists between the cylindrical portion and the coil spring from the seat to a tip edge of the cylindrical portion.

16. The sliding type constant velocity universal joint of claim 11, wherein the roller assembly includes an inner ring that is pivotable with respect to the trunnion shaft, the trunnion shaft is elliptically cylindrical, and the inner ring is fitted pivotably with respect to the trunnion shaft, leaving a radial gap.

17. The sliding type constant velocity universal joint of claim 11, wherein the roller assembly includes an inner ring that is pivotable with respect to the trunnion shaft, and the trunnion shaft has a spherical surface portion, and the inner ring is fitted pivotably around the spherical surface portion.

18. The sliding type constant velocity universal joint of claim 11, wherein the spring receptacle member is made of a pressed metal or a sintered metal.

* * * * *